US011167714B2

(12) United States Patent
Markusic et al.

(10) Patent No.: US 11,167,714 B2
(45) Date of Patent: Nov. 9, 2021

(54) OCCUPANT RESTRAINT SYSTEM FOR A VEHICLE

(71) Applicant: Honda Motor Co., Ltd., Tokyo (JP)

(72) Inventors: Craig A. Markusic, Bellefontaine, OH (US); Skye Malcolm, Upper Arlington, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 75 days.

(21) Appl. No.: 16/678,492

(22) Filed: Nov. 8, 2019

(65) Prior Publication Data

US 2021/0138989 A1     May 13, 2021

(51) Int. Cl.
*B60R 21/18*     (2006.01)
*B60R 22/02*     (2006.01)
*B60R 21/231*     (2011.01)

(52) U.S. Cl.
CPC ............ *B60R 21/18* (2013.01); *B60R 22/023* (2013.01); *B60R 2021/23161* (2013.01)

(58) Field of Classification Search
CPC . B60R 21/18; B60R 21/207; B60R 21/23138; B60R 2021/0006; B60R 2021/23146; B60R 2021/23161; B60R 22/023
See application file for complete search history.

(56) References Cited

U.S. PATENT DOCUMENTS

| 3,953,049 | A | * | 4/1976 | Surace | B60R 21/08 |
| | | | | | 280/730.1 |
| 7,748,736 | B2 | * | 7/2010 | Turner | B60R 21/23184 |
| | | | | | 280/733 |
| 7,971,901 | B2 | * | 7/2011 | Tomitaka | B60R 21/232 |
| | | | | | 280/730.2 |
| 8,007,001 | B2 | * | 8/2011 | Lin | B60N 2/885 |
| | | | | | 280/733 |
| 8,038,170 | B2 | | 10/2011 | Haraoka et al. | |
| 8,282,126 | B2 | * | 10/2012 | Wiik | B60R 21/23138 |
| | | | | | 280/730.2 |

(Continued)

FOREIGN PATENT DOCUMENTS

| DE | 102017209417 | 12/2018 |
| DE | 102017218331 | 4/2019 |

(Continued)

*Primary Examiner* — Laura Freedman
(74) *Attorney, Agent, or Firm* — Rankin, Hill & Clark LLP

(57) ABSTRACT

A vehicle occupant restraint system includes an occupant seat, three-point seatbelt device, and an airbag module mounted to the seat. The three-point seatbelt device has a webbing that is configured to, when the occupant is seated on the seat, extend from an upper side in a vicinity of the occupant's outboard shoulder to a lower side in a vicinity of an inboard side of the occupant's waist and obliquely across the occupant's upper body so as to restrain the upper body. The airbag module has an airbag cushion and an inflator for providing inflation gas for the airbag cushion. In a crash event the airbag cushion inflates and deploys from the seat in a vicinity of the occupant's inboard shoulder obliquely across the occupant's upper body, and in a fully deployed state the airbag cushion directly connects to the webbing extended across the occupant's upper body.

20 Claims, 3 Drawing Sheets

(56) References Cited

U.S. PATENT DOCUMENTS

| | | | |
|---|---|---|---|
| 8,388,019 B2 * | 3/2013 | Wipasuramonton ........................ B60R 21/2342 280/730.2 |
| 8,414,018 B2 * | 4/2013 | Choi ................ B60R 21/23138 280/730.1 |
| 9,132,798 B2 | 9/2015 | Yasuoka |
| 9,233,661 B2 * | 1/2016 | Yamanaka ............ B60R 21/207 |
| 9,290,151 B2 * | 3/2016 | Fujiwara ............... B60R 21/231 |
| 9,428,136 B2 * | 8/2016 | Ishida ................... B60R 21/207 |
| 9,566,882 B2 * | 2/2017 | Mihm .................... B60R 21/231 |
| 9,981,623 B2 | 5/2018 | Kobata |
| 10,077,058 B2 * | 9/2018 | Ohmi ................... G05D 1/0246 |
| 10,246,043 B2 * | 4/2019 | Schneider ............. B60R 21/207 |
| 10,315,606 B2 * | 6/2019 | Ohno .................... B60R 21/207 |
| 10,336,278 B2 * | 7/2019 | Schneider ............. B60R 21/207 |
| 10,632,955 B2 * | 4/2020 | Markusic ................ B60N 2/99 |
| 10,703,321 B2 * | 7/2020 | Deng .................... B60R 21/233 |
| 10,773,678 B2 * | 9/2020 | Markusic .......... B60R 21/23138 |
| 10,800,368 B2 * | 10/2020 | Kitagawa .......... B60R 21/01534 |
| 2017/0282832 A1 | 10/2017 | Kondo et al. |
| 2018/0281727 A1 | 10/2018 | Jenny |
| 2020/0101930 A1 * | 4/2020 | Nagasawa ........... B60R 21/2155 |
| 2020/0324728 A1 * | 10/2020 | Deng ................ B60R 21/23138 |

FOREIGN PATENT DOCUMENTS

| | | | |
|---|---|---|---|
| JP | H11189117 | | 7/1999 |
| JP | 2007125937 A | * | 5/2007 |
| JP | 2007190944 A | * | 8/2007 |
| JP | 2009154812 A | * | 7/2009 |
| JP | 2010105544 A | * | 5/2010 |
| JP | 2011051448 | | 3/2011 |
| JP | 2012012015 A | * | 1/2012 |
| JP | 2015217740 | | 12/2015 |
| WO | 2008139655 | | 11/2008 |

* cited by examiner

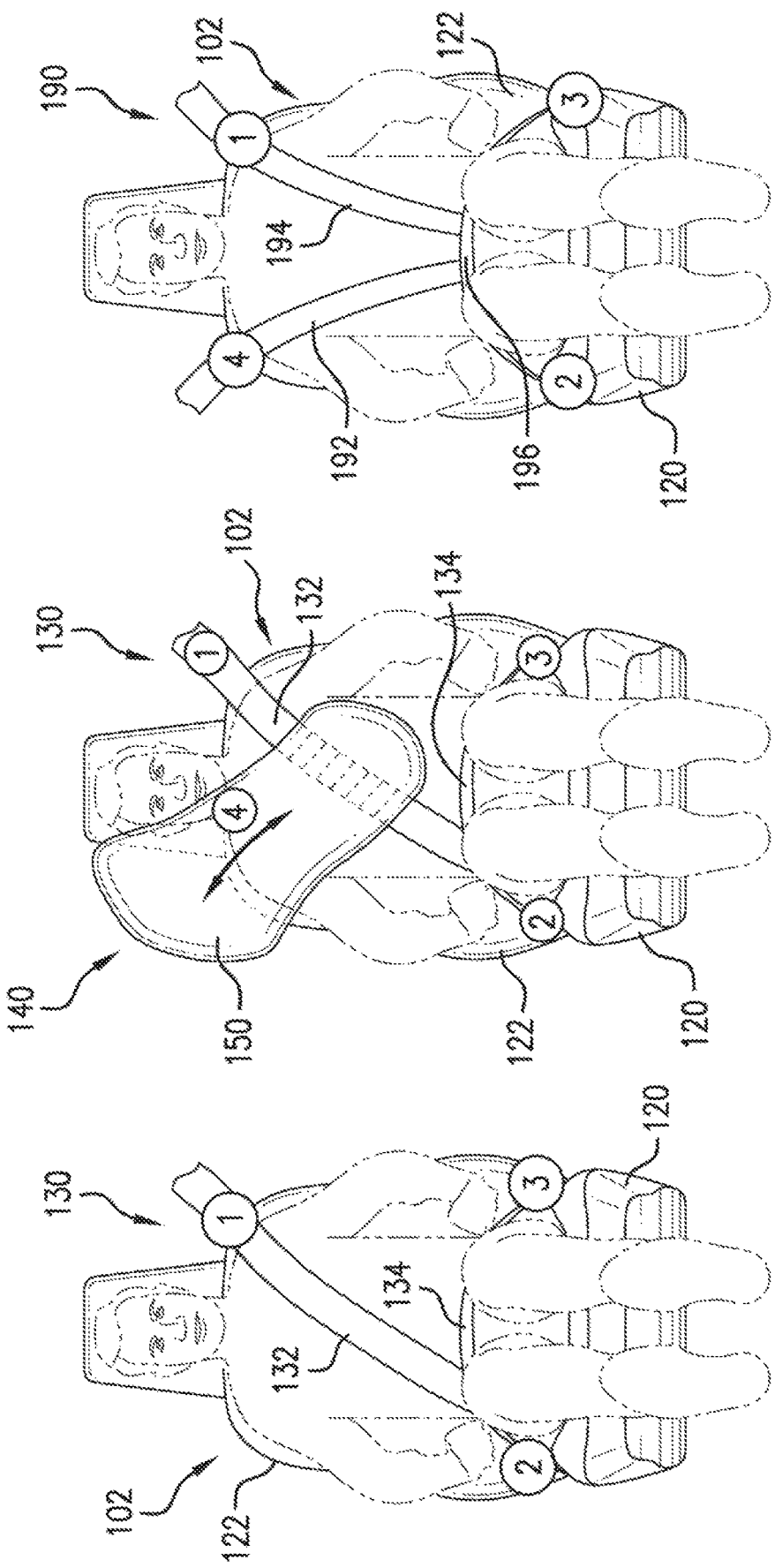

OCCUPANT RESTRAINT SYSTEM FOR A VEHICLE

BACKGROUND

Airbag devices and separate seatbelt devices are known vehicle occupant restraint systems configured to protect an occupant seated on a vehicle seat upon input of an impact load by regulating the movement of the upper body of the occupant. Known seatbelt devices typically used in vehicles are three-point seatbelts with a lap belt webbing extending over the occupant's waist and a shoulder belt webbing extending over one shoulder of the occupant and connecting with the lap belt webbing. The lap belt webbing is anchored at one end, to the seat or to the vehicle adjacent the seat. The shoulder belt webbing is connected at one end to the vehicle or to the seat and at the other end to the lap belt webbing or lap belt buckle mechanism. Known airbag devices used in vehicles include driver, passenger, side-curtain, seat-mounted side-impact, knee bolster, front right-side and left-side sensor, and pedestrian airbag modules. It is also known to combine these occupant restraint systems into a single system associated with the vehicle seat. By way of example, it is known to embed an airbag device in the shoulder belt webbing of the three-point seatbelt device. An airbag cushion expands and deploys from the shoulder belt webbing upon input of an impact load, and the airbag cushion is adapted to restrain both a chest part and an abdominal part of the occupant. It is also known to provide four-point seatbelt devices having parallel shoulder belt webbings for improved restraint in side, frontal, and rollover crashes. While providing a certain degree of protection, the known four-point seatbelt devices may cause the seat occupant discomfort as a consequence of the shoulder belt webbings contacting the neck during use, particular when a lateral spacing between the shoulder belt webbings is small. Further, the known four-point seatbelt device can be difficult to apply because of current federal regulations, and also because consumers may deem it as being too cumbersome or unfamiliar. Accordingly, the present disclosure combines an airbag device and a three-point seatbelt device to provide the benefits of a four-point seatbelt device without changing the basics of the three-point seatbelt device already applied to vehicles.

BRIEF DESCRIPTION

According to one aspect, an occupant restraint system for a vehicle, comprises a seat installed in the vehicle on which an occupant is to be seated, a three-point seatbelt device installed in the vehicle, and an airbag module configured to be mounted to the seat. The three-point seatbelt device has a webbing that is configured to, when the occupant is seated on the seat, extend from an upper side in a vicinity of an outboard shoulder of said occupant to a lower side in a vicinity of an inboard side of a waist of said occupant and obliquely across an upper body of said occupant so as to restrain the upper body. The airbag module has an inflatable airbag cushion and an inflator for providing inflation gas for the airbag cushion. In a crash event the airbag cushion is configured to inflate and deploy from the seat in a vicinity of an inboard shoulder of said occupant obliquely across the upper body of said occupant, and in a fully deployed state the airbag cushion directly connects to the webbing extended across the upper body.

According to another aspect, an occupant restraint system for a vehicle comprises a seat on which an occupant is to be seated, a three-point seatbelt device associated with the seat, and an airbag module configured to be mounted to the seat. The three-point seatbelt device has a webbing that is configured to, when the occupant is seated on the seat, extend from an upper side in a vicinity of an outboard shoulder of said occupant to a lower side in a vicinity of an inboard side of a waist of said occupant and obliquely across an upper body of said occupant so as to restrain the upper body. The airbag module has an inflatable airbag cushion and an inflator for providing inflation gas for the airbag cushion. In a crash event the airbag cushion is configured to inflate and deploy from the seat in a vicinity of an inboard shoulder of said occupant and directly connect to the webbing extended across the upper body. The connection of the airbag cushion to the webbing converts the three-point seatbelt device into a four-point seatbelt device.

According to another aspect, an occupant restraint system for a vehicle comprises a seat on which an occupant is to be seated, a three-point seatbelt device associated with the seat, and an airbag module configured to be mounted to the seat. The three-point seatbelt device has a webbing that is configured to, when the occupant is seated on the seat, extend from an upper side in a vicinity of an outboard shoulder of said occupant to a lower side in a vicinity of an inboard side of a waist of said occupant and obliquely across an upper body of said occupant so as to restrain the upper body. The airbag module has an inflatable airbag cushion and an inflator for providing inflation gas for the airbag cushion. In a crash event the airbag cushion is configured to inflate and deploy from an upper side of the seat over an inboard shoulder of said occupant and directly connect to the webbing extended across the upper body. A reversible adhesion mechanism is applied to both the airbag cushion and the webbing, and the reversible adhesion mechanism configured to latch the airbag cushion to the webbing upon contact of the airbag cushion with the webbing.

BRIEF DESCRIPTION OF THE DRAWINGS

FIGS. 5, 6, and 7 are schematic views comparing a known three-point seatbelt device and a known four-point seatbelt device to the exemplary occupant restraint system.

DETAILED DESCRIPTION

Figure 1:
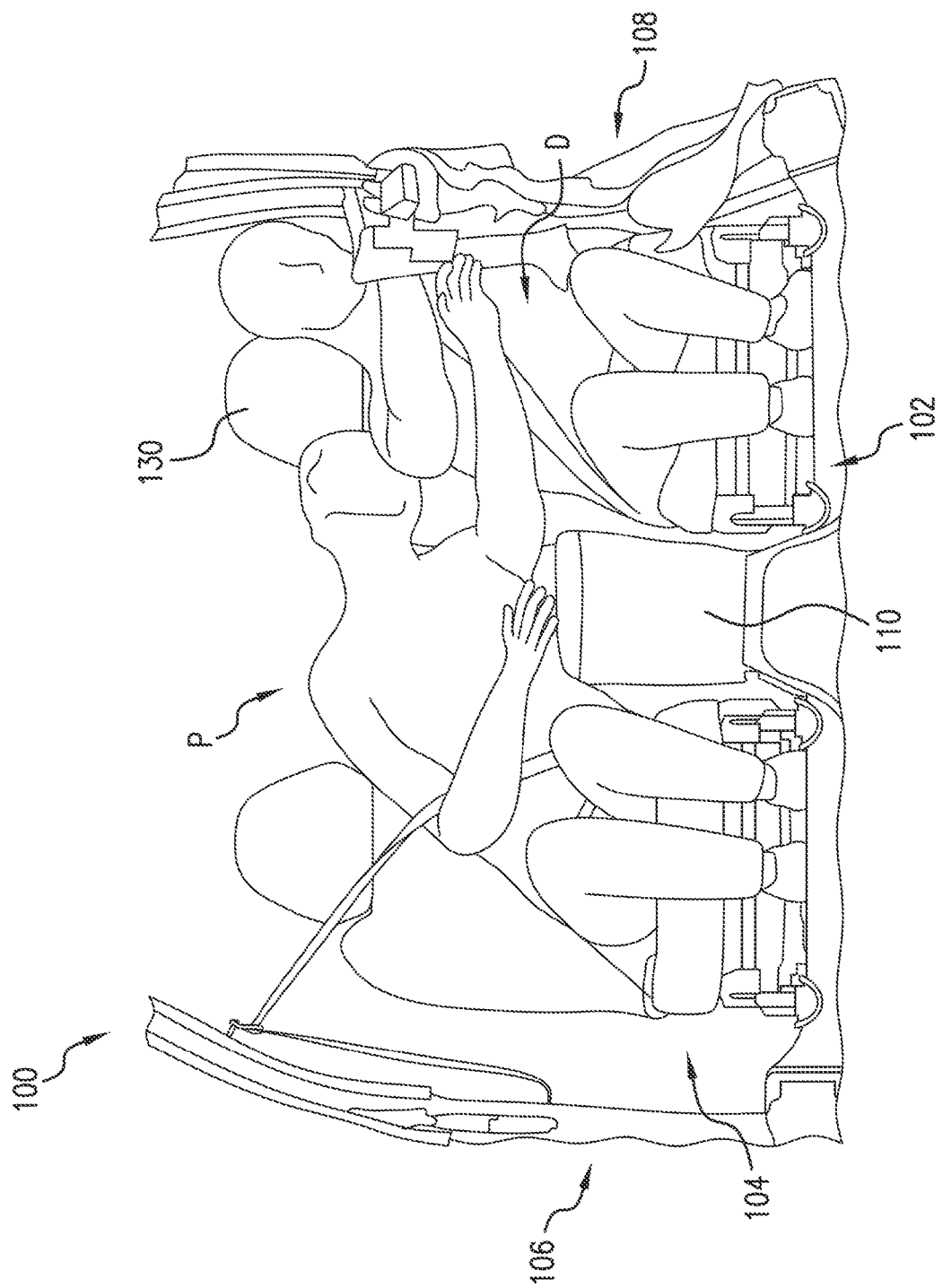
FIG. 1 is a schematic illustration of a vehicle during a side impact crash event without a side impact occupant restraint airbag module according to the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 schematically illustrates a vehicle 100 in a crash event, particularly a side impact crash event. The vehicle 100 includes a driver seat 102 and a passenger seat 104 spaced from the driver seat in a vehicle width direction. In a side impact crash event, an occupant sitting on the non-struck side 106 of the vehicle (the passenger P in FIG. 1, i.e., the far-side occupant) is directed towards the struck side 108 of the vehicle. This can result in undesired interactions with the occupant sitting on the struck side (the driver D in FIG. 1, i.e., the near-side occupant) and/or interior objects of the vehicle (e.g., a center console 110 positioned laterally between the driver and passenger seats). Also, each of the occupants shown in FIG. 1 and the like is an AM50 (i.e., a model covering 50% of American adult males) dummy, for example.

Figure 2:
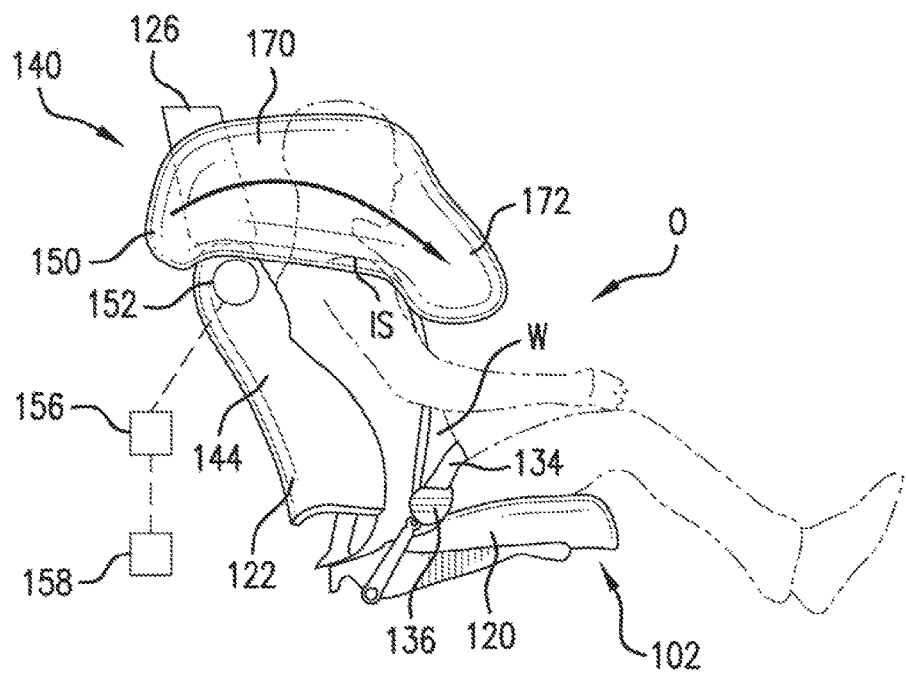
FIGS. 2, 3 and 4 are schematic views of a vehicle seat including an exemplary occupant restraint system, the occupant restraint system including an airbag module having an inflatable airbag cushion, and the airbag cushion is in an inflated, deployed state.
Figures 3, 4:
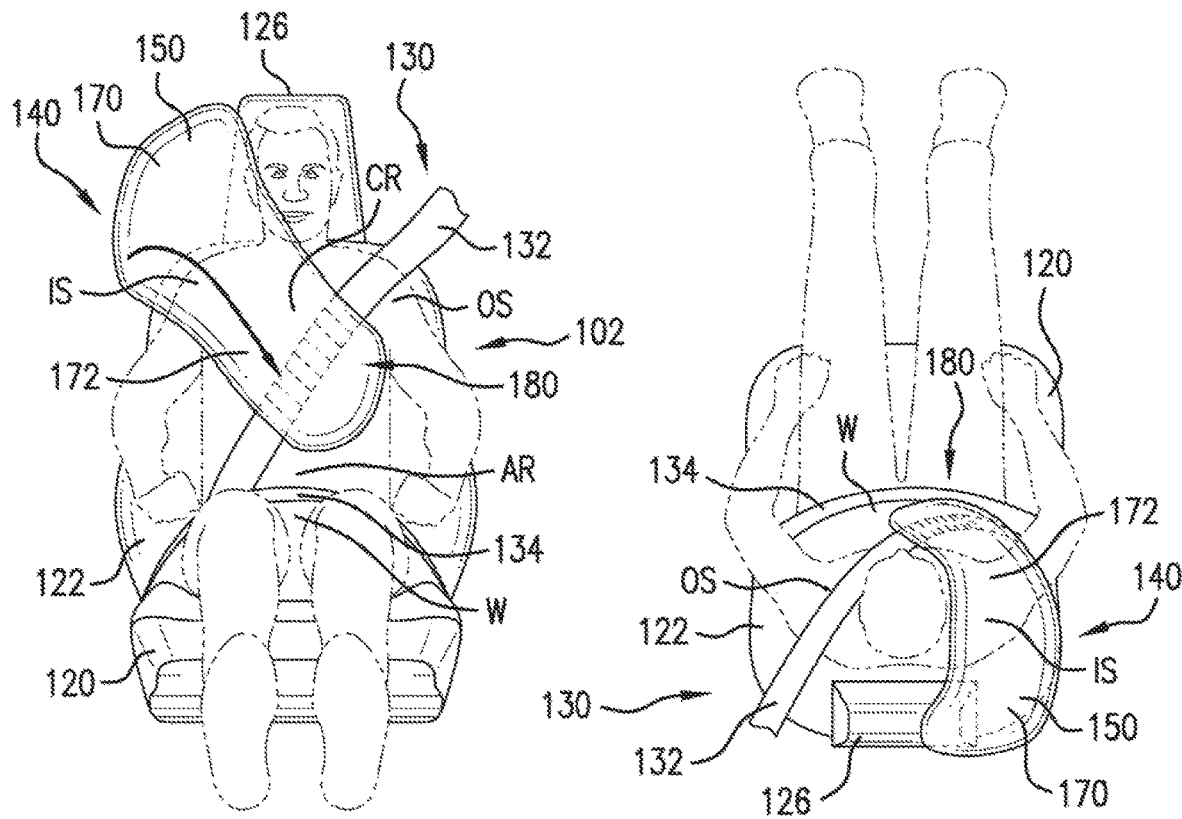

FIGS. 2-4 depict the driver D (hereinafter, referred to as "occupant O") seated in the driver seat 102 (hereafter, referred to a "vehicle seat"). The vehicle seat 102 includes a seat cushion 120 and a seat back 122 which can be reclinably connected to a rear end of the seat cushion. A headrest 126 can be connected to an upper end of the seat back 122. The seat cushion 120 supports the buttocks and thighs of a seated occupant, the seat back 122 supports the back of the occupant, and the headrest 126 supports the head of the occupant. The occupant O seated in the vehicle seat 102 is restrained by a three-point seatbelt device 130, which is a typical seatbelt device installed in currently manufactured vehicles. As shown, with the three-point seatbelt device 130 a shoulder belt webbing 132 is strung across the upper body of the occupant O seated in the vehicle seat 102, and connects with a lap belt webbing 134 strung across the occupant's waist W. The webbings 132, 134 are anchored to a buckle mechanism 136 provided on an inboard side of the vehicle seat (the side in a vehicle width direction inside). As a result, with the three-point seatbelt device 130, an outboard shoulder OS (the shoulder in the vehicle width direction outside) and chest region CR of the occupant is restrained by the webbing 132, and the abdominal region AR and waist W of the occupant are restrained by the webbing 134. Therefore, in the typical three-point seatbelt device 130, the webbing 132 is configured to, when the occupant O is seated on the vehicle seat 102, extend from an upper side in a vicinity of the occupant's outboard shoulder OS to a lower side in a vicinity of an inboard side of the occupant's waist W and obliquely across the occupant's upper body so as to restrain the upper body. It should be appreciated that with the three-point seatbelt device 130 an inboard shoulder IS (the shoulder in the vehicle width direction inside) of the occupant is not directly restrained by the shoulder belt webbing 132.

According to the present occupant restraint system, and with reference to FIGS. 2-4, an airbag module 140 is mounted to an upper part of the vehicle seat 102 and is configured to protect the occupant O seated in the vehicle seat 102 in a crash event. It should be appreciated that in a side impact crash event (see FIG. 1) the airbag module 140 is configured to restrain the far-side occupant which in turn reduces the likelihood of contact between the occupants and/or the vehicle interior objects. According to one aspect, the exemplary airbag module 140 is mounted to an inboard side 144 (a side located inward in the vehicle width direction) of the seat back 122. The airbag module 140 includes an inflatable airbag cushion 150 and an inflator 152 (gas generator) as main components. The inflator 152 may be of conventional configuration and may be configured to be housed in the seat back 122 and to provide inflation gas into the airbag cushion 150 during airbag deployment. The airbag cushion 150 may be made of one or more than one panel coupled by stitching to expand when inflated during airbag deployment to provide protection to the occupant seated on the vehicle seat 102 (and to the far-side occupant during a side impact crash event). It should be appreciated that an ECU 156 (i.e., a controller) can be mounted in the vehicle and can be electrically connected to the inflator 152. An impact sensor 158 adapted to predict and/or detect a crash event can be electrically connected to the ECU 156.

By way of example, the impact sensor 158 can include a longitudinal acceleration sensor part that detects acceleration in a vehicle longitudinal direction, and a lateral acceleration sensor part that detects acceleration in the vehicle width direction. The ECU 156 is configured to actuate the inflator 152 based on a signal from the impact sensor 158. More specifically, the ECU 156 activates the inflator 152 when a frontal collision of the vehicle is detected based on a signal from the impact sensor 158. This frontal collision includes not only a full-lap frontal collision (a symmetrical collision), but also an asymmetrical collision such as an offset collision, an oblique collision, and a small overlap collision. Also, the ECU 156 activates the inflator 152 when a side collision of the vehicle is detected based on a signal from the impact sensor 158. The gas injected from the inflator 152 is then supplied into the airbag cushion 150 so as to bring the airbag cushion to inflate and deploy.

In FIGS. 2-4, in a crash event the airbag cushion 150 is configured to inflate and deploy from the vehicle seat 102 in a vicinity of the occupant's inboard shoulder IS obliquely across the occupant's upper body, and in a fully deployed state the airbag cushion 150 directly connects to the shoulder belt webbing 132 extended obliquely across the occupant's upper body. More particularly, in a crash event the airbag cushion 150 is configured to inflate and deploy from an upper side of the seat back 122 forwardly in the vehicle longitudinal direction and outwardly in the vehicle width direction laterally across the upper body of the occupant. As shown, in the fully deployed state the airbag cushion 150 includes an extended upper chamber or first portion 170 which is extended both forward in the vehicle longitudinal direction and upward in a vehicle height direction, and an extended lower chamber or second portion 172 forward of the first portion and extended obliquely downward in the vehicle height direction and laterally in the vehicle width direction. The first portion 170 defines an inboard side airbag curtain sized and configured to provide restraint of the occupant's head. The second portion 172 is deployed at least partially over the inboard shoulder IS of the occupant and is configured to directly connect with the shoulder belt webbing 132. As a result, the inboard shoulder IS of the occupant is able to be restrained by the airbag cushion 150. Further as shown, the second portion 172 extends past the connection with the shoulder belt webbing 132 to provide a better load distribution over the chest region CR in a frontal crash event, which can reduce injury to chest region.

To allow for this direct connection between the shoulder belt webbing 132 and the airbag cushion 150, a reversible adhesion mechanism 180 is applied to both the airbag cushion and the shoulder belt webbing. The reversible adhesion mechanism is configured to latch the airbag cushion 150 to the shoulder belt webbing 132 upon contact of the airbag cushion with the shoulder belt webbing, and is configured to maintain the connection between the shoulder belt webbing 132 and the airbag cushion. According to one aspect, the reversible adhesion mechanism 180 can comprise a hook and loop type arrangement (i.e., a Velcro®-type fastener) wherein a loop portion is secured to one of the shoulder belt webbing 132 and the airbag cushion 150 and the hook portion is secured to the other of the shoulder belt webbing 132 and the airbag cushion 150. The reversible adhesion mechanism 180 can also include smart latching using micro-hairs, and can include an adhesive provided on at least one of the shoulder belt webbing 132 and the airbag cushion 150 that bonds upon contact between the shoulder belt webbing 132 and the airbag cushion 150. It should be appreciated that alternative reversible adhesion mechanisms for latching the shoulder belt webbing and the airbag cushion are contemplated.

FIGS. 5-7 are schematic views comparing the known three-point seatbelt device 130 and a known four-point seatbelt device 190 to the exemplary occupant restraint system having the airbag module 140 for converting the three-point seatbelt device 130 to a four-point seatbelt device. FIG. 5 depicts the three points of restraint associated with the known three-point seatbelt device 130 with the lap belt webbing 134 extending over the occupant's waist and the shoulder belt webbing 132 extending over the occupant's outboard shoulder OS and connecting with the lap belt webbing. The lap belt webbing 134 is anchored at one end, to the vehicle seat 102 or to the vehicle body adjacent the seat. The shoulder belt webbing 132 is connected at one end to the vehicle body or to the vehicle seat 102 and at the other end to the lap belt webbing or buckle mechanism. FIG. 6 depicts the four points of restraint associated with the known four-point seatbelt device 190. The four-point seatbelt device 190 includes a first, or inboard shoulder belt webbing 192 extending from the top portion to the bottom portion of the seat back 122 adjacent the inboard side of the seat cushion 120. The four-point seatbelt device 190 further includes a second, or outboard, shoulder belt webbing 194 extending from the top portion to the bottom portion of the seat back 122 adjacent the outboard side of the seat cushion 120. The four-point seatbelt device further includes a lap belt webbing 196 extending between the inboard and outboard sides of the seat cushion 120, with the shoulder belt webbings 192, 194 connected to the lap belt webbing 196 via, for example, at least one buckle mechanism. FIG. 7 depicts the vehicle seat 102 with the three-point seatbelt device 130 and the exemplary airbag module 140 described above. As depicted, the connection of the deployed airbag cushion 150 to the shoulder belt webbing 132 converts the three-point seatbelt device 130 into a four-point seatbelt device having four points of restraint similar to the known four-point seatbelt device 190.

It should be appreciated that when the airbag cushion 150 inflates and deploys, the airbag cushion 150 opposes the occupant's inboard shoulder IS from the vehicle width direction inside. In this way, both the inboard and outboard shoulders of the occupant are able to be restrained, so behavior of the occupant P when a frontal collision occurs is able to be effectively suppressed. It should also be appreciated that in a side impact crash event (see FIG. 1), the occupant sitting on the non-struck side of the vehicle (the "far-side" occupant) is directed towards the struck side of the vehicle by crash forces. The airbag cushion 150 is configured to actively engage the far-side occupant and gradually absorb a far-side occupant load applied to the airbag cushion. This, in turn, provides additional restraint of the far-side occupant against lateral movement within the vehicle 100.

Accordingly, the exemplary occupant restraint system provides the benefits of a four-point seatbelt device without changing the basic three-point seatbelt configuration already in vehicles and would also require no additional effort from the occupant. The deployable fourth point supplemental restraint device 140 dynamically converts the three-point seatbelt device 130 to a four-point seatbelt device in the event of a crash. The deployable fourth point supplemental restraint device comprises the seat mounted airbag cushion 150 that deploys over occupant's inboard shoulder and across their thorax or chest region. The airbag cushion 150 directly connects to the shoulder belt webbing 132 and provides the fourth element of a four-point restraint system. The inflated airbag cushion 150 distributes load more evenly across thorax than the shoulder belt webbing alone and the extended upper chamber 170 stabilizes the occupants head and provides additional energy absorbing capacity in the event of a severe near side crash.

Although the exemplary airbag module 140 is shown to be stored in the driver seat 102, those skilled in the art will recognize that the airbag module 140 disclosed herein can be included within any seat assembly (e.g., the passenger seat 104 and a rear seat) and is not limited by the illustrations herein. It should be appreciated that the airbag module 140 can be mounted in both the driver seat 102 and the passenger seat 104. Further, the airbag module 140 may be stored in and deployed from bucket-style seat assemblies, such as that shown in the above described figures, or may be stored in and deployed from any other style seat assembly (e.g., bench seats).

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An occupant restraint system for a vehicle, comprising:
a seat installed in the vehicle and configured to seat an occupant;
a three-point seatbelt device installed in the vehicle and having a webbing that is configured to, when the occupant is seated on the seat, extend from an upper side in a vicinity of an outboard shoulder of said occupant to a lower side in a vicinity of an inboard side of a waist of said occupant and obliquely across an upper body of said occupant so as to restrain the upper body;
an airbag module configured to be mounted to the seat, the airbag module having an inflatable airbag cushion and an inflator for providing inflation gas for the airbag cushion, where in a crash event the airbag cushion is configured to inflate and deploy from the seat in a vicinity of an inboard shoulder of said occupant obliquely across the upper body of said occupant; and
a latch mechanism associated with at least one of the airbag cushion and the webbing, the latch mechanism is configured to directly connect the airbag cushion in a deployed state to the webbing extended across the upper body upon direct contact of the airbag cushion in the deployed state with the webbing extended across the upper body.

2. The system of claim 1, wherein the airbag module is mounted to an upper portion of an inboard side of a seat back of the seat.

3. The system of claim 1, where in a crash event the airbag cushion is configured to inflate and deploy forwardly in a vehicle longitudinal direction and outwardly in a vehicle width direction.

4. The system of claim 3, wherein the airbag cushion includes a first portion extended both forward in the vehicle longitudinal direction and upward in a vehicle height direction, and a second portion forward of the first portion and extended obliquely downward in the vehicle height direction.

5. The system of claim 4, wherein the second portion is configured to directly connect with the webbing.

6. The system of claim 4, wherein the first portion is configured to extend over a seat back of the seat and forward of a head of said occupant to provide restraint of the occupant's head.

7. The system of claim 1, wherein the latch mechanism is a reversible adhesion mechanism applied to both the airbag cushion and the webbing, the reversible adhesion mechanism configured to latch the airbag cushion in the deployed state to the webbing upon contact of the airbag cushion in the deployed state with the webbing.

8. The system of claim 1, where in a crash event the connection of the airbag cushion to the webbing converts the three-point seatbelt device into a four-point seatbelt device.

9. The system of claim 8, wherein the airbag cushion is configured to inflate and deploy from an upper side of the seat over the inboard shoulder of said occupant.

10. The system of claim 9, wherein the airbag cushion is configured to inflate and deploy laterally across the upper body of said occupant.

11. The system of claim 10, wherein in the deployed state the airbag cushion includes an extended upper chamber which defines an inboard side airbag curtain configured to provide restraint of a head of the occupant.

12. An occupant restraint system for a vehicle, comprising:
a seat configured to seat an occupant;
a three-point seatbelt device associated with the seat and having a webbing that is configured to, when the occupant is seated on the seat, extend from an upper side in a vicinity of an outboard shoulder of said occupant to a lower side in a vicinity of an inboard side of a waist of said occupant and obliquely across an upper body of said occupant so as to restrain the upper body;
and an airbag module configured to be mounted to the seat, the airbag module having an inflatable airbag cushion and an inflator for providing inflation gas for the airbag cushion, where in a crash event the airbag cushion is configured to inflate and deploy from the seat in a vicinity of an inboard shoulder of said occupant and directly connect to the webbing extended across the upper body upon direct contact of the inflated airbag cushion with the webbing extended across the upper body, the connection of the inflated airbag cushion to the webbing converts the three-point seatbelt device into a four-point seatbelt device.

13. The system of claim 12, wherein a reversible adhesion mechanism is applied to both the airbag cushion and the webbing, the reversible adhesion mechanism configured to latch the inflated airbag cushion to the webbing upon direct contact of the inflated airbag cushion with the webbing.

14. The system of claim 12, wherein the airbag cushion is configured to inflate and deploy from an upper side of the seat over the inboard shoulder of said occupant and laterally across the upper body of said occupant.

15. The system of claim 14, wherein in a fully deployed state the airbag cushion includes an extended upper chamber which defines an inboard side airbag curtain configured to provide restraint of a head of the occupant.

16. The system of claim 15, wherein the airbag cushion includes a first portion extended both forward in a vehicle longitudinal direction and upward in a vehicle height direction, the first portion defines the extended upper chamber, and a second portion forward of the first portion and extended obliquely downward in the vehicle height direction.

17. The system of claim 16, wherein the second portion is configured to directly connect with the webbing.

18. An occupant restraint system for a vehicle, comprising:
a seat configured to seat an occupant;
a three-point seatbelt device associated with the seat and having a webbing that is configured to, when the occupant is seated on the seat, extend from an upper side in a vicinity of an outboard shoulder of said occupant to a lower side in a vicinity of an inboard side of a waist of said occupant and obliquely across an upper body of said occupant so as to restrain the upper body;
and an airbag module configured to be mounted to the seat, the airbag module having an inflatable airbag cushion and an inflator for providing inflation gas for the airbag cushion, where in a crash event the airbag cushion is configured to inflate and directly deploy from an upper side of the seat over an inboard shoulder of said occupant and directly connect to the webbing extended across the upper body,
wherein a reversible adhesion mechanism is applied to both the airbag cushion and the webbing, the reversible adhesion mechanism configured to latch the inflated airbag cushion to the webbing upon direct contact of the inflated airbag cushion with the webbing.

19. The system of claim 18, wherein the connection of the airbag cushion to the webbing converts the three-point seatbelt device into a four-point seatbelt device.

20. The system of claim 18, wherein the airbag module is mounted to an upper portion of an inboard side of a seat back of the seat.

* * * * *